(12) United States Patent
Ishikawa et al.

(10) Patent No.: US 6,461,738 B2
(45) Date of Patent: Oct. 8, 2002

(54) POLYIMIDE-BASED INSULATING FILM COMPOSITION, INSULATING FILM AND INSULATING FILM-FORMING METHOD

(75) Inventors: Seiji Ishikawa, Ube; Musubu Ichikawa, Ueda, both of (JP)

(73) Assignee: Ube Industries, Inc. (JP)

( * ) Notice: Subject to any disclaimer, the term of this patent is extended or adjusted under 35 U.S.C. 154(b) by 0 days.

(21) Appl. No.: 09/791,179

(22) Filed: Feb. 23, 2001

(65) Prior Publication Data

US 2001/0020081 A1 Sep. 6, 2001

(30) Foreign Application Priority Data

Mar. 1, 2000 (JP) .................................. 2000-055779

(51) Int. Cl.⁷ .......................... B32B 9/04; B32B 27/00; C08L 83/03
(52) U.S. Cl. .................... 428/447; 428/473.5; 427/387; 525/431; 525/440; 528/28; 528/38; 528/68
(58) Field of Search .................. 427/387; 428/447, 428/473.5; 525/431, 440; 528/20, 28, 68, 38

(56) References Cited

U.S. PATENT DOCUMENTS 4,829,131 A * 5/1989 Lee ............................. 428/447

| | | |
|---|---|---|
| 5,180,627 A | 1/1993 | Inoue et al. |
| 5,643,986 A | 7/1997 | Ishikawa et al. |
| 5,677,393 A * | 10/1997 | Ohmori et al. ............. 156/329 |

FOREIGN PATENT DOCUMENTS

JP       57-41491       9/1982

* cited by examiner

*Primary Examiner*—Robert Dawson
*Assistant Examiner*—Michael J Feely
(74) *Attorney, Agent, or Firm*—Schnader Harrison Segal & Lewis LLP

(57) ABSTRACT

A polyimide-based insulating film composition comprising (a) 100 parts by weight of an organic solvent-soluble polyimidosiloxane obtained from a tetracarboxylic acid component and a diamine component comprising 45 to 90 mole percent of a diaminopolysiloxane represented by the following general formula (1):

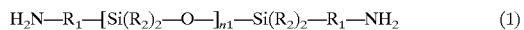

$$H_2N-R_1-[Si(R_2)_2-O-]_{n1}-Si(R_2)_2-R_1-NH_2 \quad (1)$$

0.5 to 40 mole percent of a polar group-containing aromatic diamine and 0 to 50 mole percent of an aromatic diamine with plural benzene rings, (b) 2 to 40 parts by weight of a polyvalent isocyanate and (c) an organic solvent. The composition has satisfactory storage stability and printing properties, while its cured films exhibit solvent resistance, with both heat resistance and flex resistance.

11 Claims, No Drawings

POLYIMIDE-BASED INSULATING FILM COMPOSITION, INSULATING FILM AND INSULATING FILM-FORMING METHOD

BACKGROUND OF THE INVENTION

1. Field of the Invention

The present invention relates to a polyimide-based insulating film composition, an insulating film and an insulating film-forming method, and more specifically, it relates to a polyimide-based insulating film composition comprising a soluble polyimidosiloxane and a polyvalent isocyanate (polyvalent isocyanate compound), an insulating film and an insulating film-forming method.

The polyimide-based insulating film composition of the invention has satisfactory storage stability (relatively low viscosity is consistently maintained over long periods) and printing properties, and its cured films exhibit satisfactory adhesive properties and solvent resistance.

The insulating film (cured film) of the invention has suitable adhesive properties onto substrates, flex resistance and electrical properties while also exhibiting heat and moisture resistance (PCT), and can be used as an electrically insulating protective film.

When the polyimide-based insulating film composition of the invention is coated onto a silicon wafer, flexible wiring board or the like as a solution composition and then dried and cured to form a protective film, substantially no curling occurs and the protective film exhibits excellent flex resistance and heat resistance as well as adhesion to the substrate, while no pretreatment of the substrate with an adhesion promoter such as a silane coupling agent is required; it can therefore form an excellent protective film.

2. Description of the Related Art

The use of aromatic polyimides, epoxy resins and the like as electrically insulating protective films, for the purpose of providing insulating films for solid elements, semiconductor integrated circuits, flexible wiring boards and the like, has been known to the prior art.

Epoxy resins have plating resistance and satisfactory adhesive properties for substrates, and are therefore used in epoxy dams and the like, but when they are used as insulating films, there have been drawbacks such as rigidity, poor flexibility and impaired bending properties of the insulating films formed by thermosetting.

Aromatic polyimides are generally poorly soluble in organic solvents and therefore must be used as solutions of the aromatic polyimide precursors (aromatic polyamic acids) to form coating films, which are then subjected to prolonged heat treatment at high temperature for drying and imidation to form the aromatic polyimide protective films; this, however, results in the drawback of thermal deterioration of the electrical or electronic members being protected.

On the other hand, aromatic polyimides that are soluble in organic solvents are known, such as aromatic polyimides obtained by polymerization and imidation of biphenyltetracarboxylic acid components and diamine compounds in organic polar solvents such as described, for example, in Japanese Examined Patent Publication No. 57-41491, but these polyimides have exhibited insufficient adhesion (adhesive properties) with silicon wafers, glass plates, flexible boards and the like, and have therefore required pretreatment of the substrates with adhesion promoters.

BRIEF SUMMARY OF THE INVENTION

It is an object of the present invention to provide a polyimide-based insulating film composition with satisfactory storage stability (relatively low viscosity consistently maintained over long periods) and printing properties, whose insulating films (cured films) exhibit satisfactory solvent resistance and adequate balance between heat resistance and flexibility, as well as an insulating film and insulating film-forming method.

In other words, the present invention provides a polyimide-based insulating film composition that comprises (a) 100 parts by weight of an organic solvent-soluble polyimidosiloxane obtained from a tetracarboxylic acid component and a diamine component comprising 45 to 90 mole percent of a diaminopolysiloxane represented by the following general formula (1):

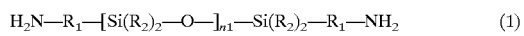

$$H_2N-R_1-[Si(R_2)_2-O-]_{n1}-Si(R_2)_2-R_1-NH_2 \quad (1)$$

wherein $R_1$ represents a divalent hydrocarbon group or a phenyl group, $R_2$ each independently represents an alkyl group of 1 to 3 carbon atoms or a phenyl group, and nl represents an integer of 3 to 30, 0.5 to 40 mole percent of a polar group-containing aromatic diamine and 0 to 50 mole percent of an aromatic diamine with plural benzene rings, (b) 2 to 40 parts by weight of a polyvalent isocyanate and (c) an organic solvent.

The invention further provides a polyimide-based insulating film obtained by coating a substrate with the aforementioned polyimide-based insulating film composition and then heat-treating it.

The invention still further provides a polyimide-based insulating film-forming method whereby the aforementioned polyimide-based insulating film composition is coated onto a substrate and then heat treated at 50 to 200° C., and preferably 120 to 160° C.

DETAILED DESCRIPTION OF THE INVENTION

Preferred embodiments of the present invention will now be explained.

1) The aforementioned polyimide-based insulating film composition wherein the polar group-containing aromatic diamine is represented by the following general formula (2):

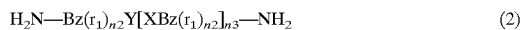

$$H_2N-Bz(r_1)_{n2}Y[XBz(r_1)_{n2}]_{n3}-NH_2 \quad (2)$$

wherein Bz represents a benzene ring, X and Y each independently represent a direct bond, $CH_2$, $C(CH_3)_2$, $C(CF_3)_2$, O, Bz or $SO_2$, $r_1$ represents COOH or OH, n2 represents 1 or 2, and n3 represents 0, 1 or 2 but preferably 1.

2) The aforementioned polyimide-based insulating film composition wherein the polycyclic aromatic diamine with plural benzene rings is represented by the following general formula (3):

$$H_2N-[BzX]_{n4}Y[XBz]_{n4}-NH_2 \quad (3)$$

wherein Bz represents a benzene ring, X and Y each independently represent a direct bond, Bz, $CH_2$, $C(CH_3)_2$, O or $SO_2$, and n4 is 1 or 2).

3) The aforementioned polyimide-based insulating film composition wherein the inherent viscosity of the polyimidosiloxane (0.5 g/100 ml) is 0.05 to 3.

4) The aforementioned polyimide-based insulating film composition which further comprises (d) a microfiller.

5) The aforementioned polyimide-based insulating film composition wherein the proportion of each component to (a) 100 parts by weight of the polyimidosiloxane is (b) 2 to 40 parts by weight of the polyvalent isocyanate, (c) 50 to 200 parts by weight of the solvent and (d) 20 to 150 parts by weight of the microfiller.

The polyimidosiloxane of the invention may be obtained, for example, by reacting a tetracarboxylic acid component with a diamine component comprising 45 to 90 mole percent of a diaminopolysiloxane, 0.5 to 40 mole percent of a polar group-containing aromatic diamine and 0 to 50 mole percent of at least one aromatic diamine with plural benzene rings to prepare a polyamic acid, and then imidating it. Alternatively, the step of preparing the amic acid may be omitted, and imidation carried out in one step at a relatively high temperature.

The reaction between the tetracarboxylic acid component and the aromatic diamine component may be carried out by random or block reaction or a combination of two or more different homogeneous reactions (with rebonding reaction depending on the case). The polyimidosiloxane reaction product may also be used directly without separation from the solution.

According to the invention, the proportion of the diaminopolysiloxane contained in the diamine component is 45 to 90 mole percent, the proportion of the polar group-containing aromatic diamine component is 0.5 to 40 mole percent and the proportion of the aromatic diamine component with plural benzene rings is 0 to 50 mole percent, in the polyimidosiloxane component. The component proportions are preferably not higher or lower than these ranges, because this may cause a reduction of the curvature radius of the protective film, thus lowering the flex resistance, lowering of the adhesion and heat resistance, and reduction in the moisture resistance.

As tetracarboxylic dianhydrides there may be mentioned aromatic tetracarboxylic dianhydrides such as 3,3',4,4'-biphenyltetracarboxylic dianhydride, 2,2',3,3'-biphenyltetracarboxylic dianhydride, 2,3,3,4'-biphenyltetracarboxylic dianhydride, 3,3',4,4'-benzophenonetetracarboxylic dianhydride, bis(3,4-dicarboxyphenyl)ether dianhydride, pyromellitic dianhydride, 2,3,6,7-naphthalenetetracarboxylic dianhydride, 1,2,5,6-naphthalenetetracarboxylic dianhydride, 1,2,4,5-naphthalenetetracarboxylic dianhydride, 1,4,5,8-naphthalenetetracarboxylic dianhydride, 2,2-bis(2,5-dicarboxyphenyl)propane dianhydride, 1,1-bis(2,3-dicarboxyphenyl)ethane dianhydride and 1,1-bis(3,4-dicarboxyphenyl)sulfone dianhydride, and alicyclic tetracarboxylic dianhydrides such as cyclopentanetetracarboxylic dianhydride, cyclohexanetetracarboxylic dianhydride and methylcyclohexenetetracarboxylic dianhydride.

The aforementioned tetracarboxylic dianhydrides may be used alone or in combinations of any two or more.

As tetracarboxylic dianhydrides with high solubility in solvents for a high concentration of the polyimidosiloxanes, and which give imide insulating films with high heat resistance, there are particularly preferred 2,3,3',4'-biphenyltetracarboxylic dianhydride, 3,3',4,4'-benzophenonetetracarboxylic dianhydride and bis(3,4-dicarboxyphenyl)ether dianhydride.

The diaminopolysiloxane as the component of the aforementioned diamine is preferably a compound represented by the following general formula (1):

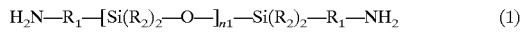
$$H_2N-R_1-[Si(R_2)_2-O-]_{n1}-Si(R_2)_2-R_1-NH_2 \quad (1)$$

wherein $R_1$ represents a divalent hydrocarbon group or a phenyl group, $R_2$ each independently represents an alkyl group of 1 to 3 carbon atoms or a phenyl group, and nl represents an integer of 3 to 30, and preferably a compound of formula (1) wherein $R_1$ and $R_2$ are a plurality of methylene groups of 2 to 6 carbon atoms, and especially 3 to 5 carbon atoms or phenylene groups. In the above formula, nl is preferably 4 to 30, and especially 4 to 20. When the diaminopolysiloxane is a mixture, the average value of nl as calculated from amino equivalents is preferably in the range of 3 to 30.

As examples of specific compounds for the diaminopolysiloxane there may be mentioned α,ω-bis(2-aminoethyl)polydimethylsiloxane, α,ω-bis(3-aminopropyl)polydimethylsiloxane, α,ω-bis(4-aminophenyl)polydimethylsiloxane, α,ω-bis(4-amino-3-methylphenyl)polydimethylsiloxane, α,ω-bis(3-aminopropyl)polydiphenylsiloxane and α,ω-bis(4-aminobutyl)polydimethylsiloxane.

As the polar group-containing aromatic diamine there may be mentioned those represented by the following general formula (2):

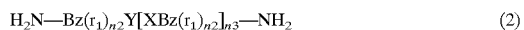
$$H_2N-Bz(r_1)_{n2}Y[XBz(r_1)_{n2}]_{n3}-NH_2 \quad (2)$$

wherein Bz represents a benzene ring, X and Y each independently represent a direct bond, $CH_2$, $C(CH_3)_2$, $C(CF_3)_2$, O Bz or $SO_2$, $r_1$ represents COOH or OH, n2 represents 1 or 2, and n3 represents 0, 1 or 2 but preferably 1.

As specific examples of the polar group-containing aromatic diamine compounds, there may be mentioned OH group-containing diamine compounds including diaminophenol compounds such as 2,4-diaminophenol; hydroxybiphenyl compounds such as 3,3'-diamino-4,4'-dihydroxybiphenyl, 4,4'-diamino-3,3'-dihydroxybiphenyl, 4,4'-diamino-2,2'-dihydroxybiphenyl and 4,4'-diamino-2,2',5,5'-tetrahydroxybiphenyl; hydroxydiphenylalkane compounds such as 3,3'-diamino-4,4'-dihydroxydiphenylmethane, 4,4'-diamino-3,3'-dihydroxydiphenylmethane, 4,4'-diamino-2,2'-dihydroxydiphenylmethane, 2,2-bis[3-amino-4-hydroxyphenyl]propane, 2,2-bis[4-amino-3-hydroxyphenyl]propane, 2,2-bis[3-amino-4-hydroxyphenyl]hexafluoropropane and 4,4'-diamino-2,2',5,5'-tetrahydroxydiphenylmethane; hydroxydiphenyl ether compounds such as 3,3'-diamino-4,4'-dihydroxydiphenyl ether, 4,4'-diamino-3,3'-dihydroxydiphenyl ether, 4,4'-diamino-2,2'-dihydroxydiphenyl ether and 4,4'-diamino-2,2',5,5'-tetrahydroxydiphenyl ether; hydroxydiphenylsulfone compounds such as 3,3'-diamino-4,4'-dihydroxydiphenylsulfone, 4,4'-diamino-3,3'-dihydroxydiphenylsulfone, 4,4'-diamino-2,2'-dihydroxydiphenylsulfone and 4,4'-diamino-2,2',5,5'-tetrahydroxydiphenylsulfone; bis(hydroxyphenoxyphenyl)alkane compounds such as 2,2-bis[4-(4-amino-3-hydroxyphenoxy)phenyl]propane; bis(hydroxyphenoxy)biphenyl compounds such as 4,4'-bis(4-amino-3-hydroxyphenoxy)biphenyl; and bis(hydroxyphenoxyphenyl)sulfone compounds such as 2,2-bis[4-(4-amino-3-hydroxyphenoxy)phenyl]sulfone.

As further specific examples of the polar group-containing aromatic diamines there may be mentioned COOH group-containing diamine compounds including benzenecarboxylic acids such as 3,5-diaminobenzoic acid and 2,4-diaminobenzoic acid; carboxybiphenyl compounds such as 3,3'-diamino-4,4'-dicarboxybiphenyl, 4,4'-diamino-3,3'-dicarboxybiphenyl, 4,4'-diamino-2,2'-dicarboxybiphenyl and 4,4'-diamino-2,2',5,5'-tetracarboxybiphenyl; carboxydiphenylalkane compounds such as 3,3'-diamino-4,4'-dicarboxydiphenylmethane, 4,4'-diamino-3,3'-dicarboxydiphenylmethane, 4,4'-diamino-2,2'-dicarboxydiphenylmethane, 2,2-bis[3-amino-4-carboxyphenyl]propane, 2,2-bis[4-amino-3-carboxyphenyl]propane, 2,2-bis[3-amino-4-carboxyphenyl]

hexafluoropropane and 4,4'-diamino-2,2',5,5'-tetracarboxybiphenyl; carboxydiphenyl ether compounds such as 3,3'-diamino-4,4'-dicarboxydiphenyl ether, 4,4'-diamino-3,3'-dicarboxydiphenyl ether, 4,4'-diamino-2,2'-dicarboxydiphenyl ether and 4,4'-diamino-2,2,5,5'-tetracarboxydiphenyl ether; carboxydiphenylsulfone compounds such as 3,3'-diamino-4,4'-dicarboxydiphenylsulfone, 4,4'-diamino-3,3'-dicarboxydiphenylsulfone and 4,4'-diamino-2,2',5,5'-tetracarboxydiphenylsulfone; bis(carboxyphenoxyphenyl) alkane compounds such as 2,2-bis[4-(4-amino-3-carboxyphenoxy)phenyl]propane; bis(carboxyphenoxy) biphenyl compounds such as 4,4'-bis(4-amino-3-carboxyphenoxy)biphenyl; and bis(carboxyphenoxyphenyl) sulfone compounds such as 2,2-bis[4-(4-amino-3-carboxyphenoxy)phenyl]sulfone.

As the aromatic diamines with plural benzene rings there may be mentioned those represented by the following general formula (3):

(3)

wherein Bz represents a benzene ring, X and Y each independently represent a direct bond, Bz, $CH_2$, $C(CH_3)_2$, O or $SO_2$, and n4 is 1 or 2.

As specific examples of the aromatic diamines with plural benzene rings there may be mentioned aromatic diamines with two benzene rings such as 4,4'-diaminodiphenyl ether, 4,4'-diaminodiphenylmethane, 4,4'-diaminodiphenylsulfone and o-tolidine; aromatic diamines with three benzene rings such as 1,4-bis(4-aminophenoxy)benzene, 1,3-bis(4-aminophenoxy)benzene, 1,3-bis(3-aminophenoxy)benzene and 1,4-bis(4-aminophenyl)benzene; or aromatic diamines with four benzene rings such as bis[4-(4-aminophenoxy)phenyl]sulfone, 2,2-bis[4-(4-aminophenoxy)phenyl] propane and 1,4-bis(4-aminophenyl)biphenyl.

The polyimidosiloxane of the invention may be obtained by reacting the components in an organic solvent, with the reaction proportions of each component such that the tetracarboxylic dianhydride is roughly equivalent to the total amount of the diamine, and preferably in a molar ratio with the tetracarboxylic dianhydride at about 1.00 to 1.2 moles to one mole of the diamine. The proportion of the tetracarboxylic dianhydride is preferably not any larger since this will tend to excessively lower the viscosity of the polyimide-based insulating composition and reduce the printing properties.

As polyimidosiloxanes there may be used high molecular weight molecules to oligomers, and the inherent viscosity (0.5 g/100 ml) is preferably 0.05 to 3.

When the proportion of the tetracarboxylic dianhydride is larger than about 1.05 and unreacted anhydride rings are formed, the product may be used directly, but an esterifying agent may also be used for ring-opening half-ester formation. The amount of alcohol used as an esterifying agent is preferably 1.1 to 20 equivalents and especially 1.5 to 5 equivalents with respect to the excess acid dianhydride. If the proportion of the alcohol is too low, unreacted anhydride rings will remain impairing the storage stability, and if the alcohol is present in excess, it will act as a poor solvent and lower the solid concentration, which is undesirable as it this will hamper coating formation by printing or the like.

The reaction product including the alcohol as an esterifying agent may be used directly, or it may be used after heating and distilling off the excess alcohol under reduced pressure.

As organic solvents for the reaction there may be mentioned nitrogen-containing solvents such as N,N-dimethylacetamide, N,N-diethylacetamide, N,N-dimethylformamide, N,N-diethylformamide, N-methyl-2-pyrrolidone, 1,3-dimethyl-2-imidazolidinone and N-methylcaprolactam; sulfur atom-containing solvents such as dimethylsulfoxide, diethylsulfoxide, dimethylsulfone, diethylsulfone and hexamethylsulforamide; oxygen-containing solvents such as phenolic solvents, for example cresol, phenol and xylenol; diglyme-based solvents such as diethyleneglycol dimethyl ether (diglyme), triethyleneglycol dimethyl ether (triglyme) and tetraglyme; as well as acetone, ethylene glycol, dioxane and tetrahydrofuran. Preferred for use are N-methyl-2-pyrrolidone, N,N-dimethylsulfoxide, N,N-dimethylformamide, N,N-diethylformamide, N,N-dimethylacetamide, N,N-diethylacetamide, γ-butyrolactone, triethyleneglycol dimethyl ether, diethyleneglycol dimethyl ether, and the like.

If necessary, aromatic hydrocarbon solvents such as benzene, toluene and xylene, or other organic solvents such as solvent naphtha or benzonitrile, may also be used in combination therewith.

The polyimide-based insulating composition of the invention comprises with respect to (a) 100 parts by weight of the aforementioned organic solvent-soluble polyimidosiloxane, (b) 2 to 40 parts by weight and preferably 5 to 40 parts by weight of a polyvalent isocyanate and (c) an organic solvent, and more preferably it comprises with respect to (a) 100 parts by weight of the organic solvent-soluble polyimidosiloxane, (b) 2 to 40 parts by weight and especially 5 to 40 parts by weight of a polyvalent isocyanate, (c) 50 to 200 parts by weight of an organic solvent and (d) 20 to 150 parts by weight of a microfiller. The viscosity is preferably 10 to 600 poises.

The polyvalent isocyanate used for the invention may be any one having at least two isocyanate groups per molecule. As examples of such polyvalent isocyanates there may be mentioned aliphatic, alicyclic and aromatic diisocyanates, for example, 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, 3-isocyanatomethyl-3,5, 5-trimethylcyclohexyl isocyanate (isophorone diisocyanate), 1,3-bis(isocyanatomethyl)cyclohexane, 4,4'-dicyclohexylmethane diisocyanate, tolylene diisocyanate, 4,4'-diphenylmethane diisocyanate, 1,5-naphthalene diisocyanate, tolidine diisocyanate and xylylene diisocyanate.

The polyvalent isocyanate may also be one derived from an aliphatic, alicyclic or aromatic polyvalent isocyanate, for example, an isocyanurate-modified polyvalent isocyanate, or a urethane-modified polyvalent isocyanate. The polyvalent isocyanate used for the invention is also preferably a blocked polyvalent isocyanate obtained by blocking of the isocyanate groups of a polyvalent isocyanate with a blocking agent.

Such blocking agents include alcohol-based, phenol-based, activated methylene-based, mercaptan-based, acid amide-based, acid imide-based, imidazole-based, urea-based, oxime-based, amine-based, imide-based and pyridine-based compounds, any of which may be used alone or in mixtures.

As specific blocking agents there may be mentioned alcohol-based compounds such as methanol, ethanol, propanol, butanol, 2-ethylhexanol, methylcellosolve, butylcellosolve, methylcarbitol, benzylalcohol and cyclohexanol; phenol-based compounds such as phenol, cresol, ethylphenol, butylphenol, nonylphenol, dinonylphenol, styrenated phenol and hydroxybenzoic acid esters; activated methylene-based compounds such as dimethyl malonate, diethyl malonate, methyl acetoacetate, ethyl acetoacetate and acetylacetone; mercaptan-based compounds such as butylmercaptan and dodecylmercaptan; acid amide-based compounds such as acetoanilide, acetic amide, ε-caprolactam, δ-valerolactam and γ-butyrolactam; acid imide-based compounds such as succinic imide and maleic imide; imidazole-based compounds such as imidazole and 2-methylimidazole; urea-based compounds such as urea, thiourea and ethylene urea; oxime-based compounds such as formaldoxime, acetoaldoxime, acetoxime, methyl ethyl ketoxime and cyclohexanonoxime; amine-based compounds such as diphenylamine, aniline and carbazole; imine-based compounds such as ethyleneimine and polyethyleneimine; bisulfites such as sodium bisulfite; and pyridine-based compounds such as 2-hydroxypyridine and 2-hydroxyquinoline.

Particularly preferred for use are Elastron [trade name: BN-P17: blocked 4,4'-diphenylmethanediisocyanate] and Elastron [BN-04, BN-08, BN-44, BN-45: 3 to 5 functional groups per molecule of blocked urethane-modified polyvalent isocyanate. All are aqueous emulsions which may be dried and isolated.] by Daiichi Kogyo Seiyaku Co., Ltd.

According to the invention, the polyvalent isocyanate is used in an amount of 2 to 40 parts by weight and preferably 5 to 40 parts by weight per 100 parts by weight of the polyimidosiloxane. If the polyvalent isocyanate is used in an amount outside of this range, the adhesion may be lower for members other than the insulating film obtained by heat treatment of the polyimide-based insulating film composition, and particularly for IC sealing resins, while the solvent resistance may be impaired and the heat resistance may be poor.

A dissociating catalyst, such as dibutyltin dilaurate, may also be added to remove the blocking agent for the blocked polyvalent isocyanate. The amount of the dissociating catalyst is preferably about 0 to 25 parts by weight per 100 parts by weight of the blocked polyvalent isocyanate.

The organic solvent used for the invention may be the organic solvent used for the aforementioned reaction, and as preferred solvents there may be mentioned nitrogen-containing solvents such as N,N-dimethylacetamide, N,N-diethylacetamide, N,N-dimethylformamide, N,N-diethylformamide, N-methyl-2-pyrrolidone, 1,3-dimethyl-2-imidazolidinone and N-methylcaprolactam; sulfur atom-containing solvents such as dimethylsulfoxide, diethylsulfoxide, dimethylsulfone, diethylsulfone and hexamethylsulforamide; oxygen-containing solvents such as phenolic solvents, for example cresol, phenol and xylenol; diglyme-based solvents such as diethyleneglycol dimethyl ether (diglyme), triethyleneglycol dimethyl ether (triglyme) and tetraglyme; as well as acetone, ethylene glycol, dioxane and tetrahydrofuran. Particularly preferred for use are N-methyl-2-pyrrolidone, N,N-dimethylsulfoxide, N,N-dimethylformamide, N,N-diethylformamide, N,N-dimethylacetamide, N,N-diethylacetamide, γ-butyrolactone, triethyleneglycol dimethyl ether, diethyleneglycol dimethyl ether, and the like.

A microfiller is also preferably used for the invention. The microfiller may be of any size or shape, but preferably has a mean particle size of 0.001 to 15 μm, and especially 0.005 to 10 μm. If used outside of this range, the resulting coating will tend to exhibit cracking when bent, and the bent sections will tend to be whitened. As examples of microfillers there may be mentioned inorganic microfillers such as Aerosil, talc, mica, barium sulfate, etc. and organic microfillers such as crosslinked NBR fine particles.

According to the invention it is also preferred to use an organic coloring pigment or inorganic coloring pigment in a prescribed amount, such as from 0 to 100 parts by weight per 100 parts by weight of the polyimidosiloxane.

The amount of the microfiller used for the invention is preferably 20 to 150 parts by weight and especially 40 to 125 parts by weight, in terms of the total microfiller, per 100 parts by weight of the polyimidosiloxane. If used in too large an amount or too small an amount, the coating may exhibit cracking when bent or may exhibit poor soldering heat resistance or copper foil coloration properties, and therefore the above-mentioned range is essential.

When Aerosil is used in combination with one or more from among talc, mica and barium sulfate, the Aerosil is preferably used at 1 to 50 parts by weight and especially 5 to 40 parts by weight per 100 parts by weight of the polyimidosiloxane, while the talc, mica, barium sulfate, etc. is preferably used at 10 to 130 parts by weight per 100 parts by weight of the polyimidosiloxane.

The polyimide-based insulating film solution composition of the invention can be easily obtained by uniformly stirring and mixing prescribed amounts of the polyimidosiloxane, polyvalent isocyanate, microfiller and organic solvent. The mixing may be accomplished in a high boiling point solvent to make a solution composition of the polyimidosiloxane. For mixture in the solvent to make the solution composition, the polyimidosiloxane reaction solution may be used directly or after dilution of the reaction solution with an appropriate organic solvent. The organic solvent used is preferably one with a boiling point from 140° C. to 210° C. Using an organic solvent with a boiling point from 180° C. to 200° C. (such as methyltriglyme) is particularly ideal since this minimizes dissipation due to evaporation of the solvent, and thus allows printing with printing ink, such as screen printing, to be carried out without hindrance.

The organic solvent is preferably used at 60 to 200 parts by weight per 100 parts by weight of the polyimidosiloxane.

The polyimide-based insulating film solution composition preferably has a solution viscosity of 100 to 600 poises at room temperature, from the standpoint of workability, solution properties and the protective film properties.

The polyimide-based insulating film solution composition may be coated onto the pattern surface of an electronic part bearing an insulating film and a pattern thereon formed with a conductor, by printing such as screen printing to a dry coating thickness of approximately 10 to 60 μm, and then heated and dried in two stages, at a temperature of about 50 to 120° C. for about 5 to 60 minutes and then at about 120 to 200° C., and preferably 120 to 160° C., for about 5 to 120 minutes, to form a suitable insulating film having an elastic modulus of 0.1 to 20 kgf/mm$^2$.

The polyimide-based insulating film solution composition of the invention has satisfactory adhesion with various members made of conductive metals and insulating materials, and it can be used as a heat-resistant adhesive capable of low temperature contact bonding.

The polyimide-based insulating composition of the invention has storage stability and is printable, and its cured films obtained by heating to dryness have a low elastic modulus (preferably 100 kgf/mm$^2$ or lower, more preferably 0.1 to 100 kgf/mm$^2$ and especially 1 to 100 kgf/mm$^2$) and satisfactory adhesion, solvent resistance, flex resistance and electrical properties, while also exhibiting heat and moisture resistance (PCT), so that satisfactory electrical insulating protective films can be obtained.

The insulating film has adhesive properties for substrates (insulating films such as patterned or polyimide films) and naturally IC sealing resins, flex resistance, heat resistance and electrical properties as well as satisfactory moisture resistance and solvent resistance (for example, against methyl ethyl ketone, acetone, isopropanol), and therefore provides an excellent protective film as a coating material.

After forming the insulating film, it is usually tin plated or bumped down and then connected to an IC and sealed with an epoxy-based sealant.

The present invention will now be explained by way of examples and comparative examples. The measurements and evaluations in the examples were conducted in the manner described below.

The following abbreviations were used for the compounds in the examples.
a-BPDA: 2,3,3',4'-biphenyltetracarboxylic dianhydride
s-BPDA: 3,3',4,4'-biphenyltetracarboxylic dianhydride
DAPSi: α,ω-bis(3-aminopropyl)polydimethylsiloxane
DABA: 3,5-diaminobenzoic acid
MBAA: bis(3-carboxy-4-aminophenyl)methane
BAPP: 2,2-bis[4-(4-aminophenoxy)phenyl]propane
TG: triglyme
NMP: N-methyl-2-pyrrolidone
DMF: N,N-dimethylformamide The evaluations of the properties in the following examples were carried out as described below.

Evaluation of Solution Compositions

Viscosity: Measured using an E-type viscometer (Tokyo Keiki Co.) at 25° C., with an ST rotor.
Viscosity stability: Represented as the ratio of the viscosity after storage for 90 days with respect to the viscosity after storage for one day.
Printing property: Films which were screen printable and exhibited no pinholes or seeping from the edges were indicated by ○, and films which were not screen printable, or exhibited pinholes or seeping from the edges were indicated by x.

Evaluation of Cured Film

IC sealing film adhesion: A test piece was prepared by coating a 35 μm thick electrolytic copper foil glossy surface with the resin composition to a thickness of 30 μm and curing, and then coating an IC sealing resin thereover to a thickness of about 1 mm and curing. The test piece was bent by hand and the condition of peeling of the sealing resin was observed. Pieces with condensation cracking of the cured film were indicated by ○, those with both condensation cracking and interface peeling of the cured film were indicated by Δ, and those with peeling at the cured film/sealing resin interface were indicated by x.

IC sealing resin A: CEL-C-5020 (Hitachi Chemical Industries, Co., Ltd.)
IC sealing resin B: 8151R (Namics Corp., Ltd.)
IC sealing resin C: 8118 (Namics Corp., Ltd.)
Elastic modulus (tensile modulus): Measured according to ASTM D882.
Electrical properties: Evaluated by the surface resistance and volume resistance.
Surface resistance: Measured according to JIS C-2103.
volume resistance: Measured according To JIS C-2103.
Solvent resistance: Film surfaces with no change in outer appearance after immersion in methyl ethyl ketone (25° C.) for 2.5 hours were indicated by ○, and film surfaces with a change in outer appearance such as swelling, peeling or dissolution were indicated by x.
Heat resistance: The soldering heat resistance was evaluated at 260° C. for 10 seconds. Films without abnormalities were indicated by ○, and films with abnormalities such as swelling were indicated by x.
PCT: Judged based on the presence of any peeling, swelling or coloration of the test piece after 96 hours at 121° C., 100% humidity.

○: Good Δ: Fair x: poor

Reference Example 1 (Fabrication of polyimidosiloxane-1)

After charging 55.84 g (0.2 millimole) of a-BPDA and 116 g of methyl triglyme (TG) in a 500 ml volume glass flask, the mixture was heated and stirred at 185° C. under a nitrogen atmosphere. Next, 156.4 g (0.17 millimole) of α,ω-bis(3-aminopropyl)polydimethylsiloxane (DAPSi, 460 amino equivalents, n=10) and 50 g of TG were added, and the mixture was further heated and stirred at 185° C. for 120 minutes. After further adding 8.59 g (0.03 millimole) of MBAA and 50 g of TG to the reaction solution, it was further heated and stirred at 185° C. for 5 hours.

The proportions of each component were as follows. Acid component: 100 mole percent a-BPDA, diamine component: 85 mole percent DAPSi, 0 mole percent BAPP, 15 mole percent MBAA; acid component/diamine component=1.0.

The reaction solution was cooled to 25° C., and found to be a solution with a solid concentration of 50.3 wt %, a ηinh of 0.173 and a solution viscosity of 35 poise.

EXAMPLE 1

TG was added to a solution of the polyimidosiloxane obtained in Reference Example 1 in a glass container to adjust the polyimidosiloxane concentration to 50 wt %, and then 11 parts by weight of Elastron BN-P17 [blocked 4,4'-diphenylmethane diisocyanate, by Daiichi Kogyo Seiyaku Co., Ltd.; oxime-based blocking agent], 0 parts by weight of dibutyltin dilaurate (DBTDL) as a dissociating catalyst, 40 parts by weight of NMP as a developing solvent, 40 parts by weight of barium sulfate (mean particle size: 0.3 μm), 20 parts by weight of talc (mean particle size: 1.8 μm), 20 parts by weight of silica fine particles (Aerosil 200, product of Nihon Aerosil Co., Ltd.) and 5 parts by weight of a silicon-based anti-foaming agent were charged therein with respect to 100 parts by weight of the polyimidosiloxane. After stirring the mixture at room temperature (25° C.) for 2 hours, it was allowed to stand overnight and then uniformly mixed with a triple roll to obtain a polyimide-based insulating film solution composition (solution viscosity: 340 poise). The type, components and properties of the composition were as shown below.

Composition Type, Components and Properties

The solution composition exhibited low viscosity change and was screen printable even after standing at about 5° C. for 80 hours. The solution composition was printed onto a copper foil using a screen printer, and then heated to dryness at 160° C. for 60 minutes to form a cured film with a thickness of 30 μm. The cured insulating film was then evaluated. A 90 μm thick insulating film was also separately fabricated and its elastic modulus was measured.

The evaluation results for the solution composition and insulating films were as follows.

Composition and Cured film Evaluation Results

Composition viscosity: 340 poise
Printing property (after standing for 90 days): ○
Elastic modulus: 12.8 kgf/mm²

| IC sealing resin adhesion: | A/B/C |
|---|---|
|  | ○/○/○ |

Solvent resistance: ○
PCT (96 hours): Δ
Soldering heat resistance: ○

EXAMPLE 2

A uniform polyimide insulating film solution composition was obtained in the same manner as Example 1, except that the components and amounts listed below were used.
Polyimidosiloxane: 100 parts by weight
Blocked diisocyanate (BN-P17): 13 parts by weight
Dissociating catalyst (DBTDL): 0 parts by weight
Developing solvent (NMP): 26 parts by weight
Barium sulfate: 40 parts by weight
Talc: 20 parts by weight
Silica fine particles (Aerosil 200): 20 parts by weight
Silicon-based foaming agent: 5 parts by weight The evaluation results for the solution composition and insulating films were as follows.

Composition and Cured film Evaluation Results

Composition viscosity: 330 poise
Printing property (after standing for 90 days): ○

| IC sealing resin adhesion: | A/B/C |
|---|---|
|  | ○/○/○ |

Solvent resistance: ○
PCT (96 hours): Δ
Soldering heat resistance: ○

EXAMPLE 3

A uniform polyimide insulating film solution composition was obtained in the same manner as Example 1, except that the components and amounts listed below were used.
Polyimidosiloxane: 100 parts by weight
Blocked diisocyanate (BN-P17): 11 parts by weight
Dissociating catalyst (DBTDL): 2 parts by weight
Developing solvent (NMP): 40 parts by weight
Barium sulfate: 40 parts by weight
Talc: 20 parts by weight
Silica fine particles (Aerosil 200): 20 parts by weight
Silicon-based foaming agent: 5 parts by weight The evaluation results for the solution composition and insulating films were as follows.

Composition and Cured film Evaluation Results

Composition viscosity: 400 poise
Printing property (after standing for 90 days): ○

| IC sealing resin adhesion: | A/B/C |
|---|---|
|  | ○/○/○ |

Solvent resistance: ○
PCT (96 hours): Δ
Soldering heat resistance: ○

EXAMPLE 4

A uniform polyimide insulating film solution composition was obtained in the same manner as Example 1, except that the components and amounts listed below were used.
Polyimidosiloxane: 100 parts by weight
Blocked diisocyanate (BN-P17): 12 parts by weight
Dissociating catalyst (DBTDL): 1 part by weight
Developing solvent (DMF): 75 parts by weight
Barium sulfate: 0 parts by weight
Talc: 15 parts by weight
Crosslinked NBR fine particles (XER-91, mean particle size: 0.07 μm, product of JSR Co.): 25 parts by weight Silica fine particles (Aerosil 130, product of Nihon Aerosil Co., Ltd.): 15 parts by weight Silicon-based foaming agent: 6 parts by weight The evaluation results for the solution composition and insulating films were as follows.

Composition and Cured film Evaluation Results

Composition viscosity: 400 poise
Printing property (after standing for 90 days): ○
IC sealing resin adhesion: A/B/C
Solvent resistance: ○
PCT (96 hours): ΔSoldering heat resistance: ○

COMPARATIVE EXAMPLE 1

A uniform polyimide insulating film solution composition was obtained in the same manner as Example 1, except that the components and amounts listed below were used.
Polyimidosiloxane: 100 parts by weight
Epoxy resin: (Epikote 157-S70, product of Yuka Shell Epoxy Co., Ltd.): 18 parts by weight
Curing catalyst (imidazole): 0.5 part by weight
Developing solvent (NMP): 0 parts by weight
Barium sulfate: 60 parts by weight
Talc: 20 parts by weight
Silica fine particles (Aerosil 50, product of Nihon Aerosil Co., Ltd.): 16 parts by weight The evaluation results for the solution composition and insulating films were as follows.

Composition and Cured film Evaluation Results

Composition viscosity: 600 poise
Printing property (after standing for 90 days): ○

| IC sealing resin adhesion: | A/B/C |
|---|---|
|  | Δ-x/Δ-x/Δ-x |

Solvent resistance: Δ-x
PCT (96 hours): Δ
Soldering heat resistance: ○

The cured films obtained in Examples 1 to 4 exhibited equivalent or better electrical properties (surface resistance, volume resistance) and flex resistance compared to the cured film obtained in Comparative Example 1 which itself exhibited satisfactory electrical properties and flex resistance.

The polyimide-based insulating compositions and insulating films of the invention with the component ratios described above exhibit the following effects.

The polyimide-based insulating compositions of the invention have satisfactory storage stability (relatively low viscosity consistently maintained over long periods) and printing properties, while their cured films exhibit satisfactory adhesion and solvent resistance.

The insulating films (cured films) of the invention have suitable adhesive properties onto substrates, flex resistance and electrical properties while also exhibiting heat and moisture resistance (PCT), and can be used as electrically insulating protective films.

We claim:

1. A polyimide-based insulating film composition comprising (a) 100 parts by weight of an organic solvent-soluble polyimidosiloxane obtained from a tetracarboxylic acid component and a diamine component comprising 45–90 mole percent of a diaminopolysiloxane represented by the following general formula (1):

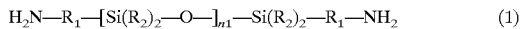
$$H_2N-R_1-[Si(R_2)_2-O-]_{n1}-Si(R_2)_2-R_1-NH_2 \quad (1)$$

wherein $R_1$ represents a divalent hydrocarbon group or a phenyl group, $R_2$ each independently represents an alkyl group of 1 to 3 carbon atoms or a phenyl group, and n1 represents an integer of 3 to 30, 0.5 to 40 mole percent of a polar group-containing aromatic diamine and 0 to 50 mole percent of an aromatic diamine with plural benzene rings, (b) 2 to 40 parts by weight of a polyvalent isocyanate and (c) an organic solvent.

2. A polyimide-based insulating film composition according to claim 1, wherein the polar group-containing aromatic diamine is represented by the following general formula (2):

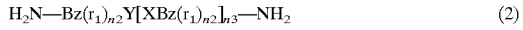
$$H_2N-Bz(r_1)_{n2}Y[XBz(r_1)_{n2}]_{n3}-NH_2 \quad (2)$$

wherein Bz represents a benzene ring, X and Y each independently represent a direct bond, $CH_2$, $C(CH_3)_2$, $C(CF_3)_2$, O, Bz or $SO_2$, $r_1$, represents COOH or OH, n2 represents 1 or 2, n3 represents 0, 1 or 2.

3. A polyimide-based insulating film composition according to claim 1, wherein the aromatic diamine with plural benzene rings is represented by the following general formula (3):

$$H_2N-[Bzx]_{n4}Y[XBz]_{n4}-NH_2 \quad (3)$$

wherein Bz represents a benzene ring, X and Y each independently represent a direct bond, Bz, $CH_2$, $C(CH_3)_2$, O or $SO_2$, and n4 is 1 or 2.

4. A polyimide-based insulating film composition according to claim 1, wherein the polyimidesiloxane is formed by reaction between the tetracarboxylic acid component and the diamine component and is carried out by random or block reaction or a combination of two or more different homogeneous reactions.

5. A polyimide-based insulating film composition according to claim 1, which further comprises an organic or inorganic coloring pigment.

6. A polyimide-based insulating film composition according to claim 1, which further comprises an anti-foaming agent.

7. A polyimide-based insulating film composition according to claim 1, which further comprises (d) a microfiller.

8. A polyimide-based insulating film composition according to claim 7, wherein the microfiller is selected from inorganic microfillers of Aerosil, talc, mica and barium sulfate and organic microfillers of crosslinked NBR fine particles.

9. A polyimide-based insulating film composition according to claim 7, said composition comprising 2 to 40 parts by weight of the polyvalent isocyanate, 50 to 200 parts by weight of the solvent and 20 to 150 parts by weight of the microfiller.

10. A polyimide-based insulating film obtained by coating a polyimide-based insulating film composition according to any one of claims 1 to 9 onto a substrate and then heat treating it.

11. A polyimide-based insulating film-forming method whereby a polyimide-based insulating film composition according to any one of claims 1 to 9 is coated onto a substrate and then heat treated at 50 to 200° C.

* * * * *